INVENTORS H. O. BURTON
L. P. MC RAE
W. J. WOLF, JR.
BY Lucian C. Canepa
ATTORNEY

1

3,421,147
BUFFER ARRANGEMENT

Herbert O. Burton, Little Silver, N.J., Lorin P. McRae, Tucson, Ariz., and William J. Wolf, Jr., New Shrewsbury, N.J., assignors to Bell Telephone Laboratories, Incorporated, New York, N.Y., a corporation of New York Filed May 7, 1965, Ser. No. 454,125
U.S. Cl. 340—172.5 13 Claims
Int. Cl. G11b *13/00*

ABSTRACT OF THE DISCLOSURE

A buffer arrangement including a multidigit register is adapted to be included in an error detection and retransmission system of the type in which information words are supplied from a source at constant digit and word rates. In a first or normal mode of operation, information words are continuously abstracted from storage locations of the register at a relatively high digit rate but at the same constant word rate at which words are applied to the register from the source. The abstraction of words from register locations is characterized by a predetermined out-of-phase relationship with respect to the application of words thereto. In a second or retransmission mode of operation, the predetermined out-of-phase relationship is altered and words are abstracted from the register at the same relatively high digit rate but at a word rate that is higher than the aforementioned constant rate. Words are abstracted from the register at the higher word rate during and subsequent to a so-called retransmission interval. Upon re-establishment of the predetermined out-of-phase relationship, the arrangement is restored to its normal mode of operation.

This invention relates to the processing of information signals and more particularly to a buffer arrangement for a digital error control system.

High accuracy in the transmission of digital information signals over a noisy channel can be achieved when the signals are encoded in accordance with an error detecting code. Correction of erroneously-received signals can then be accomplished by a repeat transmission of the portion of the signals containing the errors. These so-called feedback techniques have been shown to be very effective in controlling errors.

For some sources of information signals it is inconvenient or impossible to have the source wait while previously-sent signals are being retransmitted. There are also cases where it is required that the received signals be applied to a utilization circuit at a uniform rate. An article by F. E. Froehlich and R. R. Anderson, entitled, "Data Transmission Over a Self-Contained Error Detection and Retransmission Channel," which appears at pages 375–398 of the January 1964 issue (Part 2) of the Bell System Technical Journal, describes a continuous information transmission system in which signals are accepted from a source and delivered to a utilization circuit at a steady rate. The described system provides enough storage of information to permit the detection of errors and their correction by retransmission without the source and utilization circuit being aware that these processes are going on. The source merely puts information signals into the transmission system at its own rate, and the utilization circuit accepts highly reliable information signals from the system at the same rate.

2

The continuous operation of an error detection and retransmission system of the type described in the Froehlich-Anderson article depends on the inclusion in the transmitting and receiving terminals thereof of suitable buffer arrangements. These arrangements must be capable of buffering the source and utilization circuit from the remainder of the system and, in addition, must be compatible with the various operating modes characteristic of such a system.

An object of the present invention is the improvement of digital signal processing systems.

More specifically, an object of this invention is an error detection and retransmission system having improved buffering capabilities.

Another object of this invention is an error detection and retransmission system which includes an arrangement that performs both buffering and control functions.

Still another object of the present invention is a reliable and efficient block-oriented buffer arrangement which is characterized by simplicity of design.

These and other objects of the present invention are realized in a specific illustrative embodiment thereof, which comprises a buffer arrangement included in the transmitting terminal of an error detection and retransmission system. The arrangement is interposed between a source of information signals and equipment which encodes the information signals and then applies them to a transmission channel. The information source supplies signals to the buffer arrangement at constant digit and word rates. On the other hand, the equipment applies the encoded signals to the channel at an effective information rate that depends on the mode of operation of the system.

The illustrative arrangement includes a multiword buffer register to which signal sequences or words are applied from the information source. The application of information words to the various word locations of the register is controlled by a first ring counter which is stepped at a constant relatively low rate. In turn, information words are abstracted from the word locations of the register under control of a second ring counter which normally is stepped at the same noted relatively low rate. (However, the stepping of the second counter is normally controlled to be out of phase by a predetermined amount with the stepping of the first counter.) Thus, during normal or slow mode operation, information sequences are read out of the register at the same word rate as they are applied thereto from the source.

In response to a retransmission request signal received at the transmitting terminal, control circuitry in the terminal signals the buffer arrangement to change to a fast mode of operation. In particular, the predetermined or normal phase difference between the first and second ring counters is altered (increased) and, in addition, the rate at which words are read out of the register is increased. The phase increase results in the retransmission of previously-sent words that had been retained in the register for retransmission purposes.

Words are abstracted from the register at the noted higher rate during the retransmission interval and subsequent thereto. During this time, the effective rate at which information is abstracted from the register exceeds that at which information is applied thereto. Eventually, when the difference between the states of the two ring counters is again equal to the original predetermined phase difference, circuitry responsive to the respective conditions of the counters signals the control circuitry to restore the buffer arrangement to its normal or slow mode of operation. This return to the slow mode is signaled to occur exactly at the end of the transmission of an encoded information sequence, so that the buffer arrangement and the associated error control apparatus can be controlled to operate in a block-oriented manner characterized by a constant block length.

An essentially similar register arrangement is included in the receiving terminal of the error detection and retransmission system to perform buffering and control functions therein.

It is a feature of the present invention that a buffer arrangement comprise a register and first and second counters that control the respective rates at which information words are applied to and abstracted from the register.

It is another feature of this invention that the counters be normally stepped at the same rate but out of phase with each other by a predetermined amount, and that detection circuitry be connected to the counters to provide an indication of their relative phases.

It is a further feature of the present invention that control circuitry be combined with the buffer arrangement to alter the normal out-of-phase relationship between the two counters and to increase the stepping rate of the second counter, and that the detection circuitry be connected to the control circuitry to supply thereto a signal indicative of the re-establishment of the predetermined phase relationship between the counters.

A complete understanding of the present invention and of the above and other objects, features and advantages thereof may be gained from a consideration of the following detailed description of a specific illustrative embodiment thereof presented hereinbelow in connection with the accompanying drawing, in which.

In a copending application of H. O. Burton and R. N. Watts, Ser. No. 454,016, filed May 7, 1965 concurrently herewith, there is described an error detection and retransmission system of the general type to which the principles of the present invention may advantageously be applied. In particular, the buffers 102 and 207 shown in FIGS. 1 and 2, respectively, of the Burton-Watts application may be implemented in accordance with the principles of this invention.

The error detection and retransmission system disclosed in the cited Burton-Watts application operates in two distinct modes. In the normal or slow mode, each redundant sequence that is applied to the transmission channel thereof comprises information, check and dummy digit signals, in that order. In one particular illustrative case described therein, each such sequence includes four information digits, eight check digits and four dummy digits. On the other hand, during retransmission and thereafter, the system operates in the so-called fast mode, wherein the dummy digits are omitted from each redundant sequence applied to the channel. In the specific (12, 4) code case described therein, 20 such dummyless sequences (including five retransmitted ones) are applied to the channel before the system is returned to its slow mode of operation.

The illustrative arrangement to be described in detail hereinbelow is well suited to be included in a continuous error control system of the Burton-Watts type to perform buffering therein in an efficient manner and to generate control signals to switch the system from its fast to its slow mode of operation.

Figure 1:
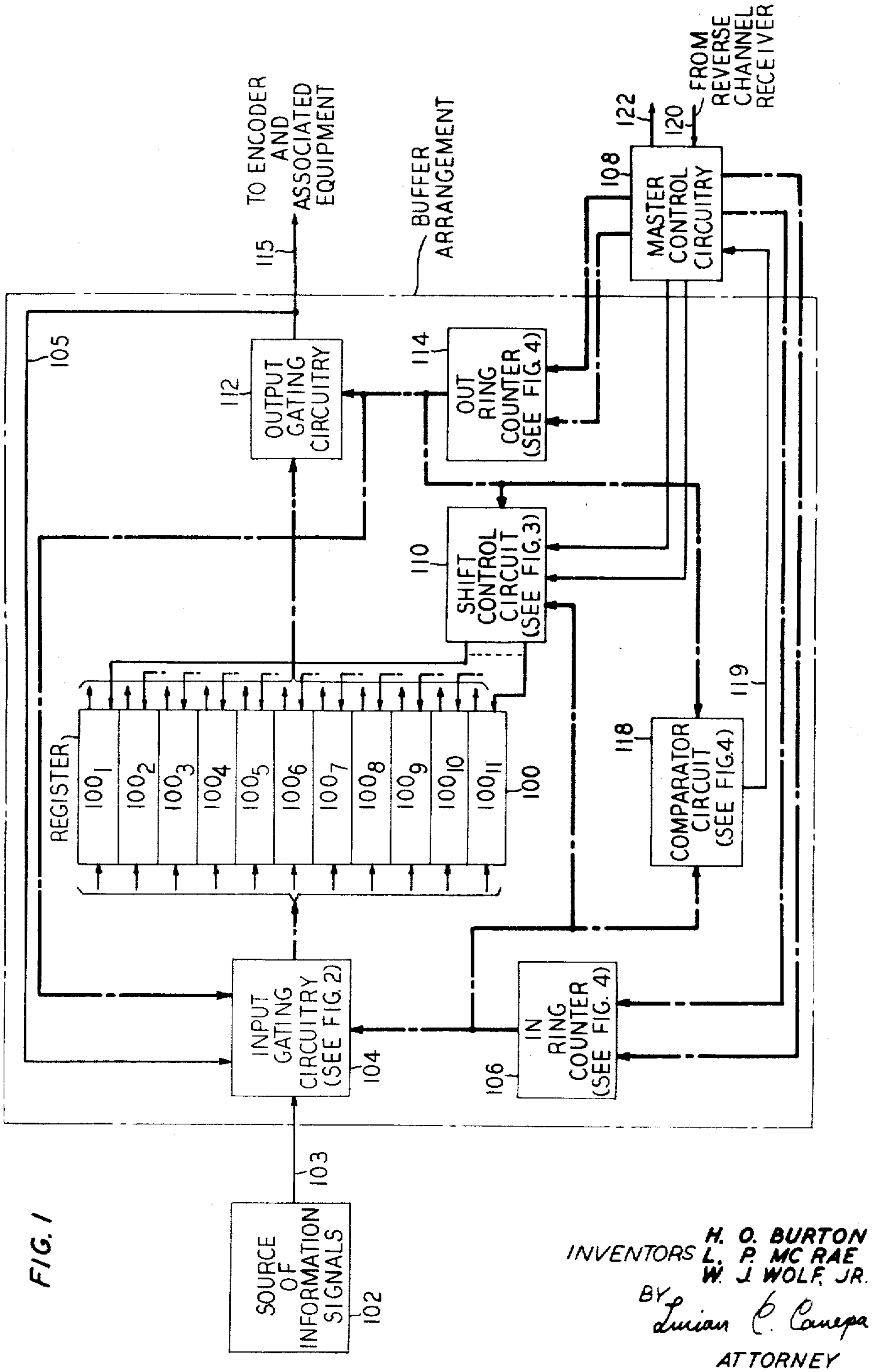
FIG. 1 shows a specific illustrative buffer arrangement made in accordance with the principles of the present invention.

The buffer arrangement included in FIG. 1 includes a conventional storage register 100 to which information signals are applied from a source 102 via input gating circuitry 104. For illustrative purposes the register 100 will be assumed herein to have the capacity to store eleven 4-digit information sequences or words. The individual 4-digit word storage locations of the register 100 are respectively designated $\mathbf{100_1}$ through $\mathbf{100_{11}}$.

Words are applied by the source 102 via the input gating circuitry 104 to the register 100 at a constant word rate. Illustratively, this rate may be considered to be 150 words per second. The digit rate of the applied 4-digit words is a constant 600 digits per second. During the various modes of operation described below, the source 102 continues to supply information signals at these constant word and digit rates.

Illustratively, eleven leads interconnect the input gating circuitry 104 and the register 100. An IN ring counter 106 connected to the circuitry 104 determines which single one of these leads is to be enabled to propagate information signals to the register 100. In this way a selection is made as to which one of the storage locations of the register 100 a particular 4-digit information word is to be applied.

In accordance with the specific assumption made above, the IN ring counter 106 includes eleven stages, only one at a time of which is activated. This single active state is in effect stepped along through the stages of the counter 106 at a rate of 150 stages per second. This is done under the control of signals applied to the counter 106 from master control circuitry 108.

The shifting of the digits of an input information word into a particular storage location of the register 100 is controlled by a shift control circuit 110 which has eleven output leads that respectively extend to the locations $\mathbf{100_1}$ through $\mathbf{100_{11}}$. Shifting of input signals into the various locations of the register 100 takes place at a rate of 600 per second. Thus, for example, if a particular 4-digit information word is supplied by the source 102 at a rate of 600 digits per second and routed by the input gating circuitry 104 to, say, the storage location $\mathbf{100_{10}}$, the control circuit 110 shifts the applied digits into the 4-digit storage location $\mathbf{100_{10}}$ at the rate of 600 digits per second.

The output leads emanating from the respective storage locations of the register 100 shown in FIG. 1 are connected to output gating circuitry 112. Under the control of signals applied to the circuitry 112 from an OUT ring counter 114, information signals are routed from a particular storage location of the register 100 to a lead 115 which extends to the encoder 107 and associated equipment shown in FIG. 1 of the aforecited Burton-Watts application. In addition, information signals supplied by the output gating circuitry 112 are fed back via a lead 105 and the input gating circuitry 104 to the register 100. In this way the signals read out of a particular storage location of the register 100 are reinserted and stored therein for retransmission purposes.

Shifting of information signals out of a particular storage location of the register 100 of FIG. 1 and through the output gating circuitry to the lead 115 is controlled by signals from the shift control circuit 110. Illustratively, these shift signals are applied to a particular storage location at a constant rate of 2400 per second.

The OUT ring counter 114 is also assumed to comprise eleven stages, only one at a time of which is activated. The active state of the counter 114 is stepped along by control or stepping signals applied thereto from the master control circuitry 108. Unlike the IN ring counter 106 which is stepped at a constant rate, the OUT counter 114 is stepped at a rate that is selecively variable. Normally, that is, during the slow mode of operation of the Burton-Watts system, the active state of the OUT counter 114 is stepped at a rate of 150 stages per second. However, during the fast mode of operation thereof the OUT counter 114 is stepped at a rate of 200 per second, whereby information signals are then removed from the register 100 faster than they are applied thereto from the source 102.

During the aforementioned slow mode of operation, the states of the two ring counters 106 and 114 are displaced by a fixed predetermined amount. This condition of the counters 106 and 114 is sensed by a comparator circuit 117 which responds thereto by applying appropriate control signals (discussed below in connection with FIG. 5) to the master circuitry 108.

In response to a retransmission request signal applied to the master control circuitry 108 via lead 120, the relative displacement or phase between the two ring counters 106 and 114 is selectively altered and, in addition, the stepping rate of the OUT ring counter 114 is increased from 150 to 200 stages per second. Eventually, due to the faster stepping rate of the OUT counter 114 relative to that of the IN counter 106, the original predetermined displacement between the active states of the counters is re-established. This re-establishment is detected by the comparator circuit 118 which, in turn, signals the master control circuit 108 via a lead 119 to return the stepping rate of the OUT ring counter 114 to 150 per second. At the same time the circuitry 108 is triggered to apply signals to a lead 122 to change the over-all operation of the associated error control system from the fast mode back to the slow mode.

The buffer arrangement shown in FIG. 1 will be better understood if a particular example of its operation is described. This will be done below in connection with the timing diagram of FIG. 5 and the symbolic representations of FIGS. 6A and 6B. However, before proceeding to the example, let us consider specific illustrative implementations for various ones of the blocks shown in FIG. 1.

Figure 2:
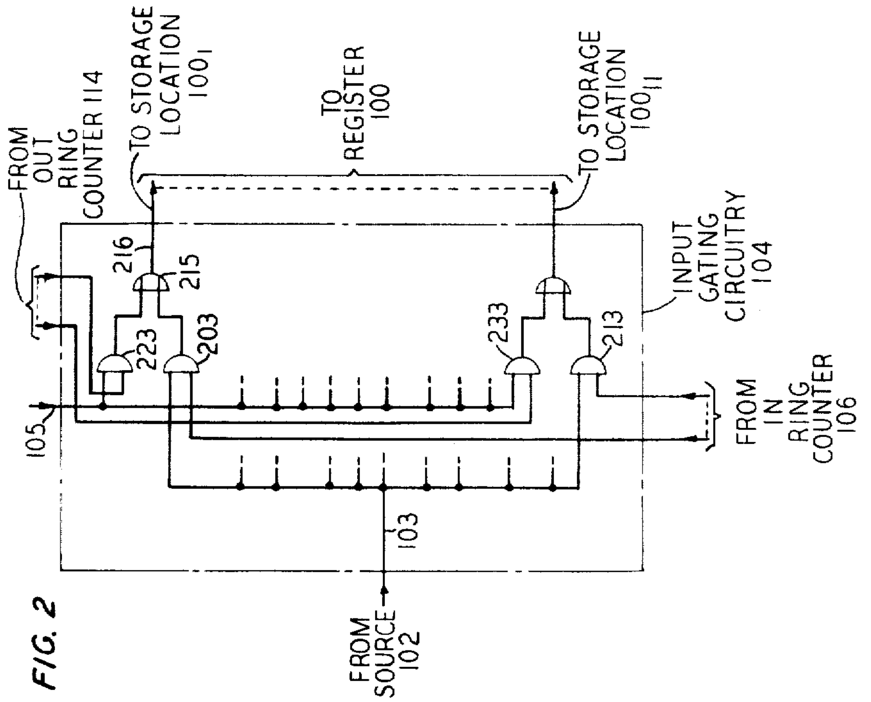

The input gating circuitry 104 is depicted in detail in FIG. 2. Input information signals are applied thereto from the source 102 via a lead 103. In the circuitry 104 the input signals are applied in parallel to eleven AND gate units 203 through 213. The other inputs to the gate units 203 through 213 are derived respectively from the outputs of the eleven stages that comprise the IN ring counter 106. Whether or not the applied information signals are passed through a particular one of the units 203 through 213 depends on wheter the other input lead thereof stems from an active or inactive stage, respectively, of the IN ring counter 106. Thus, for example, if that stages of the ring counter 106 which is connected to the gate unit 203 is active, the unit 203 is enabled to route the 4-digit information sequence applied from the source 102 to an associated OR gate unit 215. In turn, the output lead 216 of the unit 215 etxends to the topmost storage location $\mathbf{100}_1$ of the register 100 shown in FIG. 1, whereby the noted sequence is applied to the location $\mathbf{100}_1$ (under the control of shift signals from the shift control circuit 110 of FIG. 1).

Additionally, signals appearing at the output of the output gating circuitry 112 shown in FIG. 1 are applied via the feedback lead 105 to each of eleven AND gate units 223 through 233 depicted in FIG. 2. The other inputs to the gate units 223 through 233 are derived respectively from the outputs of the eleven stages that comprise the OUT ring counter 114. Whether or not the fed back signals are passed through a particular one of the units 223 through 233 depends respectively on whether the other input lead thereof stems from an active or inactive stage of the OUT ring counter 114. Thus, for example, if the particular stage of the ring counter 114 which is connected to the gate unit 233 is active, the unit 233 is enabled to route the signals appearing at the output of the output gating circuitry 112 to storage location $\mathbf{100}_{11}$ of the register 100. That same particular active stage of the counter 114 is effective to control the shift circuit 110 and the output gating circuitry 112 to shift the contents of storage location $\mathbf{100}_{11}$ to the leads 105 and 115. In this way the word read out of the storage location $\mathbf{100}_{11}$ is reinserted therein via the input gating circuitry of FIG. 2. As noted earlier above, this reinsertion serves to preserve the readout word for retransmission purposes.

Figure 3:
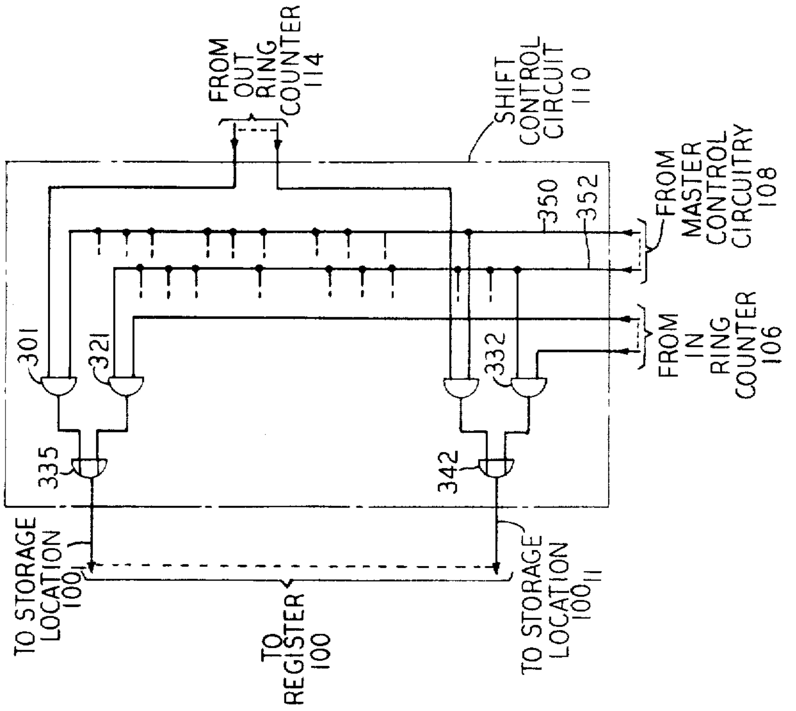
FIGS. 2, 3 and 4 are detailed schematic showings of particular portions of the arrangement shown in generalized form in FIG. 1.

The shift control circuit 110 is shown in detail in FIG. 3. The circuit 110 includes eleven sets of gate units, each set being exemplified by the upper-most one that includes the AND units 301 and 321 and the OR unit 335. Relatively high rate shift signals, for example signals at a rate of 2400 per second, are applied from the master control circuitry 108 via a lead 350 to the unit 301 and the other correspondingly-located units in the other 10 gate sets. If the stage of the OUT ring counter 114 to which the upper input lead of the unit 301 extends is active, the noted high-rate signals are routed through the units 301 and 335 to shift the contents of the storage location $\mathbf{100}_1$ to the output gating circuitry 112 at a rate of 2400 digits per second.

In an exactly similar manner relatively low rate shift signals, for example signals at a rate of 600 digits per second, are applied from the master control circuitry 108 via a lead 352 to the gate units 321 through 332. A single one of these units 321 through 332 is enabled by the IN ring counter 106. If, for example, the unit 332 is so enabled, the relatively low rate signals are routed through the units 332 and 342 to shift the information signal sequence appearing at the output of the input gating circuitry 104 into the storage location $\mathbf{100}_{11}$ at a rate of 600 digits per second.

Figure 4:
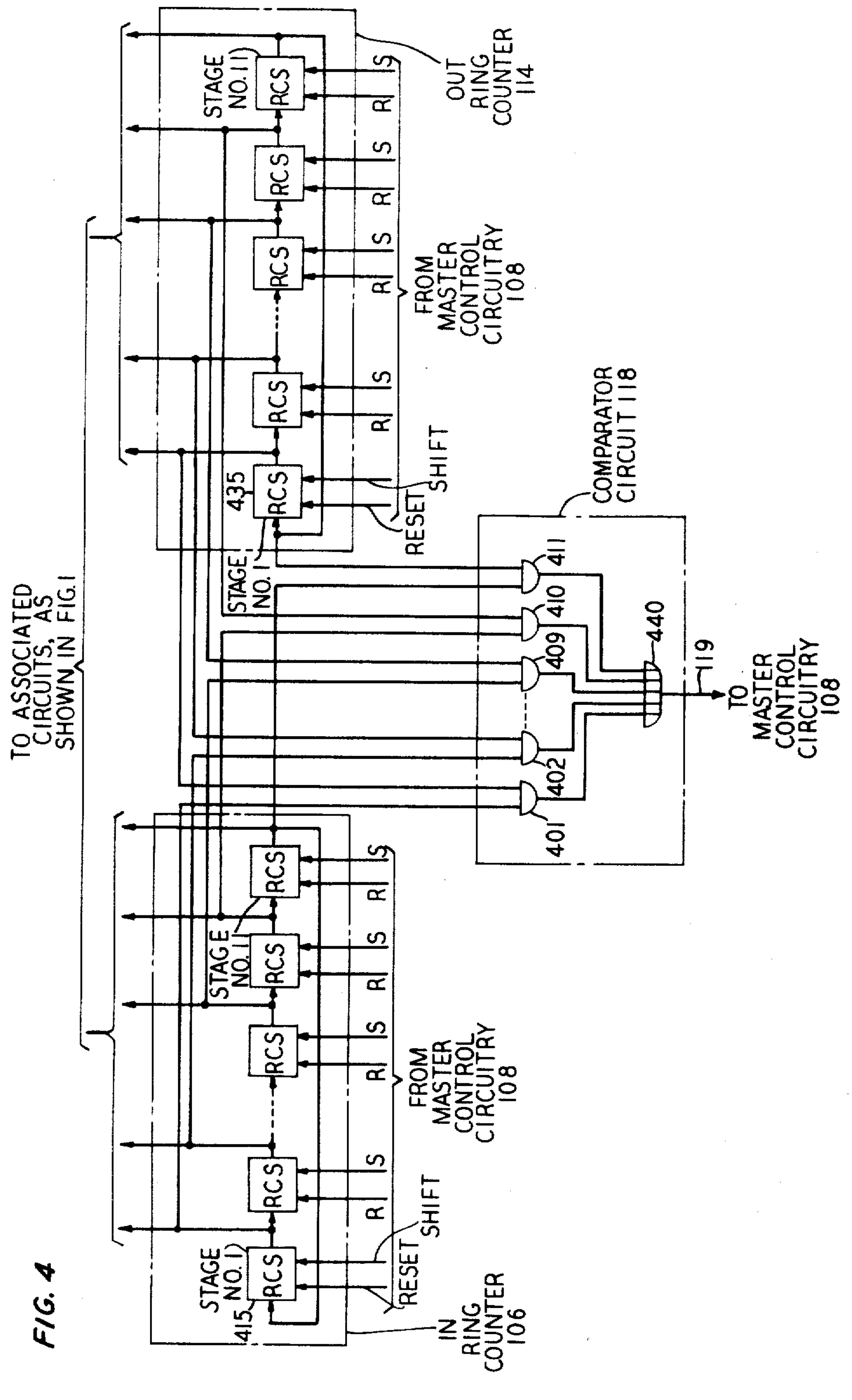

FIG. 4 is a detailed showing of the IN and OUT ring counters 106 and 114 and of the comparator circuit 118. Each of the counters 106 and 114 is of a conventional design that comprises a plurality of interconnected ring counter stages (each designated RCS). Reset and shift signals are applied to each of these stages from the master control circuitry 108. In addition, leads extend from the respective outputs of the stages to the specific associated circuitry shown in FIG. 1. Moreover, the output leads of correspondingly-positioned stages in the counters 106 and 114 are connected to a plurality of AND gate units 401 through 411 in the comparator circuit 118. For example, the output of the left-most stage 415 included in the IN counter 106 and the output of the left-most stage 435 included in the OUT counter 114, are applied to the gate unit 401. In turn, the output of the unit 401 is coupled to an OR gate unit 440 whose output extends via the lead 119 to the master control circuitry 108.

If during a particular sampling interval, the stages 415 and 435 of the ring counters 106 and 114 shown in FIG. 4 are both active, the unit 401 supplies a control signal via the unit 440 and the lead 119 to the master circuitry 108. Similarly, if any other two correspondingly-positioned stages are active during a sampling interval, one of the other units 402 through 411 supplies a control signal via the OR unit 440 to the circuitry 108. Such a control signal notifies the circuitry 108 that it should remain in, or that it should switch to, a timing cycle that corresponds to the slow mode of operation of the associated error control system.

Figure 5:
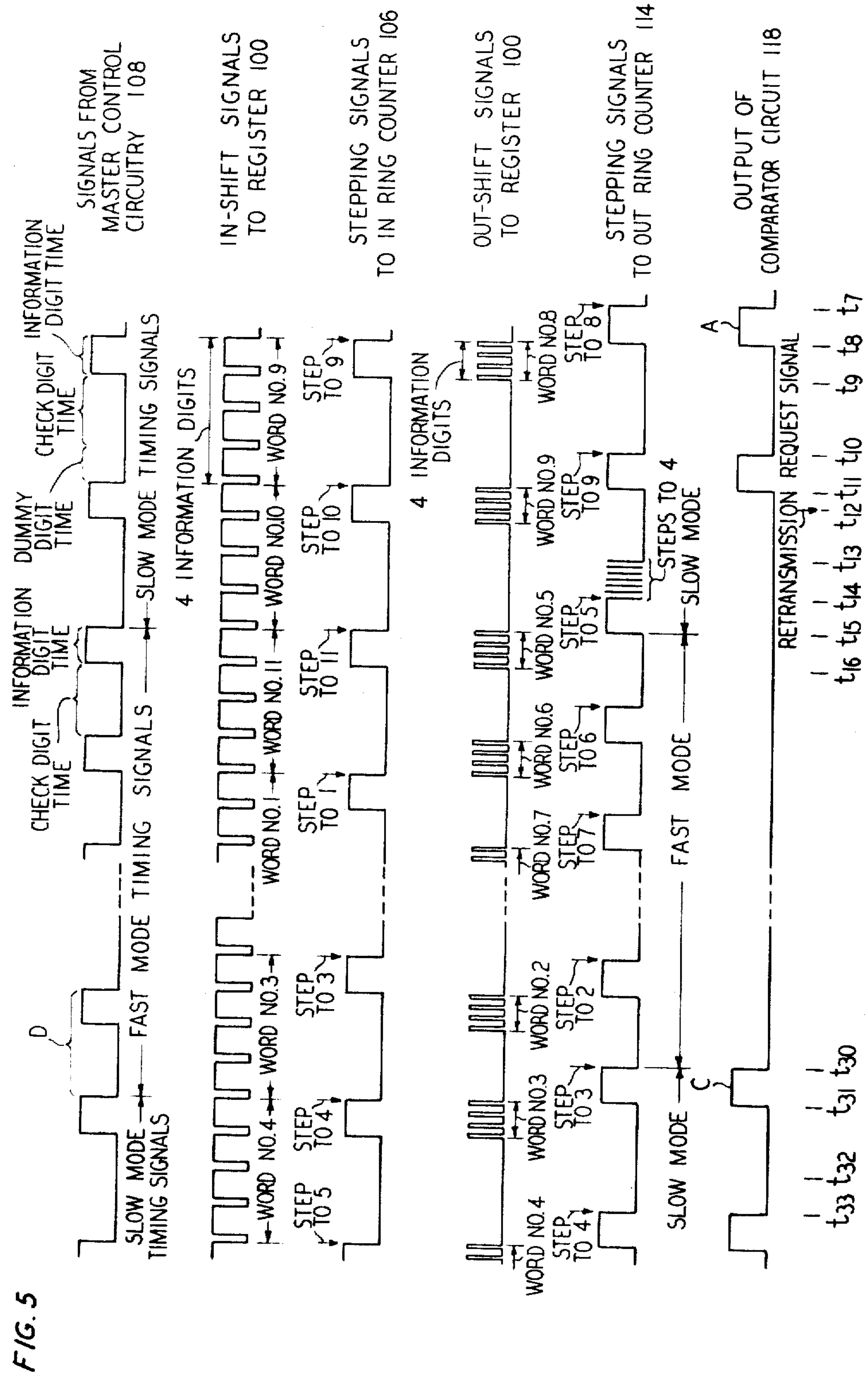
FIG. 5 is an over-all timing diagram representative of the mode of operation of the buffer arrangement illustrated in FIG. 1.
Figure 6A:
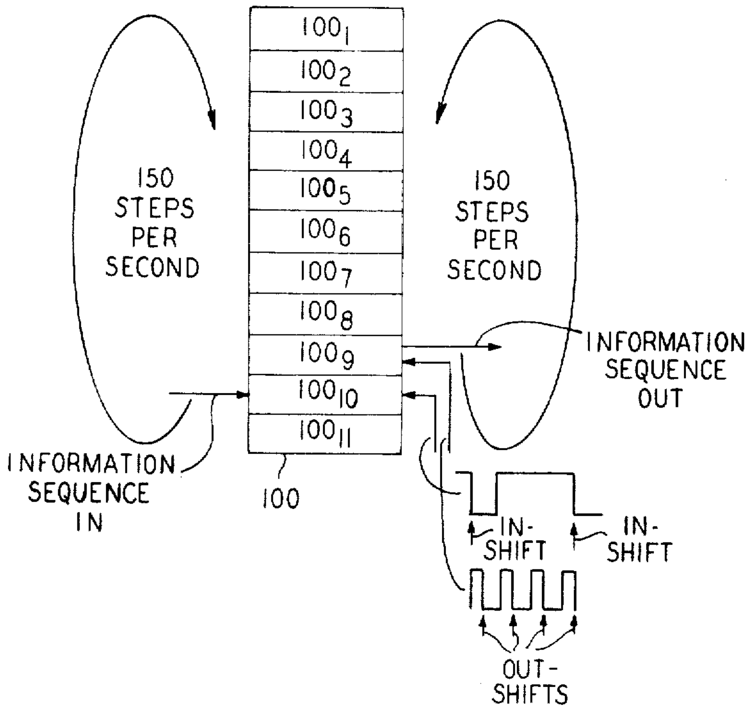
FIGS. 6A and 6B are simplified showings of the manner in which the register included in the FIG. 1 arrangement is controlled.
Figure 6B:
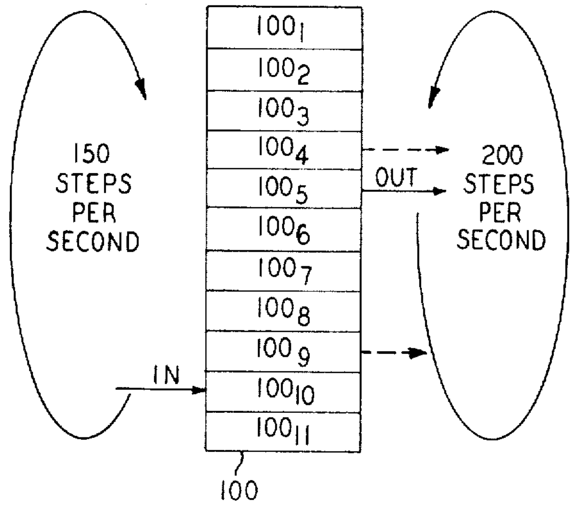

With the aid of FIGS. 5, 6A and 6B, let us now consider in more detail the over-all operation of the specific illustrative buffer arrangement shown in FIG. 1. Assume that prior to and during the time interval between $t_8$ and $t_{11}$ of FIG. 5, the master control circuitry 108 generates slow mode timing signals of the type shown in the top row of FIG. 5. The information, check and dummy digit portions of such a timing signal are indicated in the top row. At the time designated $t_8$ the IN ring counter is assumed to be stepped to the condition wherein the stage thereof that causes applied information signals to be routed to the storage location $\mathbf{100}_9$ is activated (see the third row of FIG. 5). As a result, the information signals applied to the input gating circuitry 104 during the interval between $t_8$ and $t_{11}$ are routed to the location $100_9$. Shifting of these signals into the four individual storage positions of $100_9$ is controlled by shift signals applied to the location $100_9$ by the shift control circuit 110 at a rate of 600 per second. These shift signals are represented in the second row of FIG. 5 and are indicated there as corresponding to information word No. 9.

Prior to the time designated $t_8$ in FIG. 5, specifically at time $t_7$, the OUT ring counter 114 was stepped to the condition wherein the stage thereof that causes information signals from the storage location $100_8$ of the register 100 to be applied to the output lead 115, was activated. Then during the interval between $t_8$ and $t_9$ the four information digits that had previously been applied to the storage location $100_8$ are abstracted from the register 100 at a rate of 2400 per second. These abstracted signals are applied to the associated error control equipment, wherein check and dummy digits are appended thereto during the interval between $t_9$ and $t_{11}$.

It is apparent from FIG. 5 that immediately following the application of a complete input word to a particular storage location of the register 100, the word is abstracted therefrom. During the abstraction process the first digit of the next input word is applied to the next successive storage location of the register 100. During this normal mode of operation there is an interval, for example between $t_7$ and $t_8$, in which the IN and OUT ring counters 106 and 114 are in the same condition. Illustratively, the eighth stages of the two counters 106 and 114 are active during that interval. Hence, in the interval between $t_7$ and $t_8$ the comparator circuit 118 provides an output signal (designated A in the bottom row of FIG. 5) indicative of the particular stepping displacement or phase relationship described above as being characteristic of the normal mode of operation of the two ring counters 106 and 114.

At time $t_{10}$ the active state of the OUT ring counter 114 is stepped to stage No. 9. Subsequently, at time $t_{11}$ the active state of the IN ring counter 106 is stepped to stage No. 10. This condition is symbolically represented in FIG. 6A. Moreover, FIG. 6A illustrates that four information signals are shifted out of the storage location $100_9$ during the time in which one information signal is applied to the next successive location $100_{10}$. Additionally, FIG. 6A indicates that the IN and OUT ring counters 106 and 114 are each stepped in sequence at a rate of 150 per second during normal or slow mode operation of the illustrative buffer arrangement.

Assume now that at time $t_{12}$ (FIG. 5) a retransmission request signal is applied via the lead 120 (FIG. 1) to the master control circuitry 108. In response thereto the circuitry 108 controls the buffer arrangement to change to its fast mode of operation. Specifically, during the interval between $t_{13}$ and $t_{14}$ the circuitry 108 applies six stepping signals to the OUT ring counter 114 to cause the active state thereof to propagate ahead six stages. This change in the relative displacement of the counters 106 and 114 is represented in FIG. 6B, wherein the respective states of the OUT ring counter 114 before and after the application thereto of the noted six stepping signals are respectively indicated by the lower and upper dashed arrows emanating from the storage locations $100_9$ and $100_4$.

Subsequently at time $t_{14}$ the next normally-occurring stepping signal is applied to the OUT ring counter 114, whereby the storage location $100_5$ of the register 100 is in effect selected as the next location from which information signals are to be abstracted. The location $100_5$ contains information signals which were previously applied from the register 100 to the output gating circuitry 112. Hence, the shifting-out of information signals from the location $100_5$ during the interval between $t_{15}$ and $t_{16}$ initiates the commencement of the aforementioned retransmission mode of operation. During the retransmission mode five previously-sent information sequences are retransmitted. In particular, the sequences retained in word locations $100_5$ through $100_9$ are those that are retransmitted.

During the retransmission mode and thereafter, the IN ring counter 106 continues to be stepped at a rate of 150 stages per second. Also, the digits of each applied input word continue to be shifted into the register 100 at a rate of 600 per second. However, the stepping rate of the OUT ring counter 114 is increased during the retransmission mode and sebsequent thereto. In particular, the rate is increased to 200 steps per second, whereby information words are abstracted from the register at a faster rate than they are applied thereto. The faster stepping rate of the counter 114 is evident from inspection of the fifth row of FIG. 5 wherein it is indicated that during the fast mode of operation stepping signals are applied to the ring counter 114 at a rate that is 4/3 that characteristic of the slow mode. Also, the relative stepping rates of the counters 106 and 114 are represented in FIG. 6B. It is apparent from FIG. 6B that the relatively large displacement between the IN and OUT arrows will gradually decrease. However, until the displacement is decreased to a point at which the states of the ring counters 106 and 114 overlap during some portion of their respective stepping cycles (as they did in the intervals between $t_7$ and $t_8$ and $t_{10}$ and $t_{11}$) the comparator circuit 118 provides no control signal to the master circuitry 108.

Finally, at the time designated $t_{30}$ in FIG. 5 the active state of the OUT ring counter 114 is stepped to the third stage thereof. At time $t_{30}$ the third stage of the IN ring counter 106 is also active. Hence, during the interval between $t_{30}$ and $t_{31}$ the comparator circuit 118 supplies to the master circuitry 108 a control signal, which is designated C in the bottom row of FIG. 5.

In response to the application thereto of the control signal designated C, the master circuitry 108 changes the over-all timing of the illustrative equipment. Thus, for example, the next stepping signal is applied from the circuitry 108 to the OUT ring counter 114 not at the time $t_{32}$ but instead, at the later time $t_{33}$. This slower stepping rate corresponds to a word readout rate from the register 100 of 150 per second. In the particular example assumed herein this return to the normal or slow mode of operation is signaled to occur after twenty dummyless redundant information sequences have been transmitted in the fast mode. As seen from FIG. 5 the return to the slow mode is signaled to occur exactly at the end of a redundant information sequence timing interval. Specifically, the control signal occurs exactly at the end of the basic timing signal designated D in the top row of FIG. 5. Subsequent information words each have appended thereto eight check digits and four dummy digits, whereby normal operation is resumed. Hence, the particular block-oriented nature of the described apparatus is seen to be exactly preserved.

If another retransmission request signal is applied to the master control circuitry 108 of FIG. 1 while the buffer arrangement and its associated error control equipment are in the fast mode of operation, the result is that that apparatus remains in the fast mode approximately twice as long as described hereinabove. Actually, in this event, the sequence will be 20 fast words, one slow word with inverted dummy bits, followed by 20 fast words. The intervening slow word is included to eliminate system synchronization problems caused by an unknown channel delay. However, the manner of returning to the slow mode under the control of signals applied from the comparator circuit 118 to the master circuitry 108 is exactly the same as detailed above.

As noted before, the illustrative buffer arrangement described herein is well suited for utilization as the transmitting terminal buffer 102 of the error control system disclosed in the cited Burton-Watts application. In addition, in accordance with the principles set forth above, it is apparent that a receiving terminal buffer suitable for inclusion in the Burton-Watts system also be easily implemented. Such a receiving terminal buffer is normally full of data sequences and tends to empty during retransmissions.

Thus there has been described herein a specific exemplary buffer arrangement which illustratively embodies the principles of the present invention. As set forth above, the arrangement is characterized by unique buffering and control capabilities that are compatible with the various operating modes of an associated information-processing system.

It is to be understood that the above-described arrangements are only illustrative of the application of the principles of the present invention. In accordance with these principles numerous other arrangements may be devised by those skilled in the art without departing from the spirit and scope of the invention.

What is claimed is:

1. A buffer arrangement comprising a register including plural storage locations for respectively storing plural multidigit information words, means for continuously applying information words to successive ones of said locations at a constant word rate and at a constant relatively low digit rate, and means for continuously and simultaneously abstracting information words from said locations at a variable word rate and at a constant relatively high digit rate in a predetermined out-of-phase relationship with respect to the application of words to said locations.

2. A combination as in claim 1 further comprising means connected to said abstracting means for controlling said abstracting means in a first mode of operation to abstract words at a rate that is equal to the constant rate at which words are applied to said register and for controlling said abstracting means in a second mode of operation to alter said predetermined out-of-phase relationship and to abstract words at a rate that is higher than the constant rate at which words are applied to said register.

3. A combination as in claim 2 still further comprising means responsive to the phase relationship between said applying and abstracting means for providing to said controlling means a unique signal indicative of the existence of said predetermined relationship.

4. In combination, a buffer register having plural storage locations each of which is capable of storing a multidigit word, means for applying input information words in sequence to successive ones of said locations at constant word and digit rates, means for abstracting information words from said locations at a constant digit rate and at a word rate that is either the same as or higher than said aforementioned constant word rate, means for controlling the word rate of said abstracting means, and means connected to said applying means and to said abstracting means for establishing a predetermined displacement between the locations to which words are applied and abstracted.

5. In combination, a register including a plurality of spaced storage locations for respectively storing a plurality of multibit information words, means for applying information words in sequence to said storage locations at constant bit and word rates, means for abstracting words in sequence from storage locations which have a predetermined spaced relationship to the words respectively applied thereto, said words being abstracted from said register at a constant bit rate and at a word rate that is normally equal to the rate at which words are applied to said register, master control circuitry, means responsive to signals supplied by said master control circuitry for changing the predetermined spaced relationship between the applied and abstracted words and for increasing the rate at which words are abstracted from said register by said abstracting means, and means responsive to said predetermined spaced relationship being re-established for signaling said master circuitry to control said abstracting means to return to said normal word rate.

6. A buffer arrangement comprising a register including plural storage locations for respectively storing a plurality of multidigit words, means for supplying information words in sequence, input gating circuitry inter-connecting said supplying means and the plural storage locations of said register, a plural stage IN ring counter connected to said input circuitry for controlling the routing of supplied words to selected ones of said storage locations, output gating circuitry having a single output lead and plural input leads respectively connected to said storage locations, a plural stage OUT ring counter connected to said output circuitry for controlling the successive connection of said output lead to selected ones of said input leads, and comparator means connected to said ring counters for supplying a signal indicative of the relative states of said counters.

7. A combination as in claim 6 further including shift control means responsive to the states of said ring counters for supplying shift signals to the storage locations corresponding to the respective states of said counters.

8. A combination as in claim 7 wherein said shift control means supplies relatively low rate shift signals to the storage location that corresponds to the state of said IN ring counter and supplies relatively high rate shift signals to the storage location that corresponds to the state of said OUT ring counter.

9. A combination as in claim 8 further including means for setting a single one of the stages of said IN ring counter to an active state and for then stepping this active state through the stages of said counter at a constant rate.

10. A combination as in claim 9 still further including means for setting a single one of the stages of said OUT ring counter to an active state and for then stepping this active state through the stages of said counter in a predetermined out-of-phase relationship with respect to the stepping of said IN ring counter, the stepping of said OUT ring counter normally occurring at a rate equal to the constant rate at which said IN ring counter is stepped.

11. A combination as in claim 10 wherein said setting and stepping means is responsive to a retransmission request signal for altering said predetermined out-of-phase relationship between said IN and OUT ring counters and for then stepping said OUT ring counter at a rate which is higher than that at which said IN ring counter is stepped.

12. A combination as in claim 11 wherein said comparator means responds to the re-establishment of said predetermined out-of-phase relationship between said IN and OUT ring counters by supplying a signal indicative thereof to said setting and stepping means, and wherein said setting and stepping means responds to said signal by controlling said OUT ring counter to resume stepping at the rate that is equal to the constant rate at which said IN ring counter is stepped.

13. A buffer arrangement comprising a register including plural storage locations for respectively storing plural multidigit information words, output gating circuitry having a single output lead and plural input leads respectively connected to said storage locations, an OUT ring counter connected to said circuitry for sequentially enabling connections between selected ones of said input leads and said output lead, said counter including plural stages respectively corresponding to said plural storage locations, means for switching a single one of said counter stages to its active state and for stepping said active state from stage to stage, and means connected to the storage locations of said register and responsive to the condition of said counter for applying constant rate shift signals to the particular storage location that corresponds to the single active ring counter stage, said switching and stepping means including means for normally stepping said ring counter at a low rate and further means responsive to a retransmission request signal for stepping said counter a predetermined number of times at a relatively high rate and for thereafter stepping said counter at an intermediate rate.

(References on following page)

References Cited

UNITED STATES PATENTS

| | | | |
|---|---|---|---|
| 3,012,230 | 12/1961 | Galas et al. | 340—172.5 |
| 3,048,827 | 8/1962 | Wright et al. | 340—172.5 X |
| 3,059,221 | 10/1962 | Page et al. | 340—172.5 |
| 3,229,259 | 1/1966 | Barker et al. | 340—172.5 |

OTHER REFERENCES

Skov et al., "Buffer System," IBM Technical Disclosure Bulletin, vol. 2, No. 5, February 1960, pp. 86–89.

PAUL J. HENON, *Primary Examiner.*

U.S. Cl. X.R.

340—146.1